United States Patent [19]

Luthi

[11] Patent Number: 4,581,104
[45] Date of Patent: Apr. 8, 1986

[54] METHOD OF REDUCING THE LIGNIN IN WOOD PULP WITH OXYGEN GAS RECIRCULATION

[75] Inventor: Oscar Luthi, Nashua, N.H.

[73] Assignee: Ingersoll-Rand Company, Woodcliff Lake, N.J.

[21] Appl. No.: 696,967

[22] Filed: Jan. 31, 1985

Related U.S. Application Data

[63] Continuation-in-part of Ser. No. 522,222, Aug. 11, 1983, abandoned.

[51] Int. Cl.⁴ .................... D21C 9/147; D21C 11/06
[52] U.S. Cl. ........................................ 162/43; 162/65
[58] Field of Search ............... 162/47, 65, 19, 52, 162/239, 42, 43

[56] References Cited

U.S. PATENT DOCUMENTS

3,963,561  6/1974  Richter ............................... 162/65
3,964,962  6/1976  Carlsmith ........................... 162/65
4,177,105  12/1979  Laakso et al. ...................... 162/65

Primary Examiner—Steve Alvo
Attorney, Agent, or Firm—F. S. Troidl

[57] ABSTRACT

An exothermic reaction of a gas with a gas permeable material is performed in a retention vessel. Temperature control of the exothermic reaction is obtained by recirculating the gas from the top of the vessel downwardly through and co-current to the gas permeable material and removing the downwardly flowing gas at a point above the bottom of the reactor and simultaneously recirculating gas which has been cooled into the bottom of the reactor, upwardly through and counter-current to the gas permeable material and removing the gas at a point above the bottom of the reactor.

2 Claims, 8 Drawing Figures

METHOD OF REDUCING THE LIGNIN IN WOOD PULP WITH OXYGEN GAS RECIRCULATION

This application is a continuation-in-part of application Ser. No. 522,222, filed Aug. 11, 1983, now abandoned.

The present invention relates to the gaseous reaction of material and more specifically to apparatus and processes, particularly suited for the gas phase treatment of fibrous material such as, by way of specific example, the bleaching or delignification of lignin-containing cellulose pulp.

Wood pulp may vary in their content of lignin or other non-cellulosic material. The amount of lignin in a particular pulp may be determined by appropriate conventional tests and a Kappa number assigned to the pulp which indicates the amount of lignin. The higher the Kappa number, the more lignin in the pulp.

When wood pulp is to be bleached the amount of delignification is indicated by a Kappa reduction. The higher the Kappa reduction, the higher the amount of delignification.

The reaction between lignin and oxygen is exothermic and the heat generated is proportional to the amount of lignin removed. In a reaction without substantial venting or other means for controlling the pulp temperature, the accumulated heat will result in a substantial temperature increase from top to bottom in a pulp bed. It is usually desired to keep the temperature at the top of the bed above 90° C. and preferably between 95°–100° C. to obtain a reaction rate sufficient to complete the delignification in 20–30 minutes. On the other hand, there is a risk of pulp degradation if the pulp temperature exceeds 120°–125° C. Thus it is important that the gas which reacts with the lignin of the pulp be controlled so that the temperature at the top of the pulp bed is kept within the 95°–100° C. range but the temperature at no point in the bed exceeds the 120°–125° C. temperature.

Currently known reactor systems for reacting a gaseous material with a gas permeable material include (1) flowing the reaction gas co-currently with the pulp flow and (2) flowing the gaseous material counter-currently to the pulp flow. Either system will work satisfactorily with low amounts of delignification of a Kappa reduction of 20, or less. For Kappa reductions of more than 20, it is necessary to have special arrangements in the reactor system for cooling or controlling the temperature in the pulp bed. With either co-current flow or counter-current flow, recycled cooled gas works satisfactorily for a delignification equivalent to a Kappa reduction of up to 30. However, neither system works well enough for a delignification equal to a Kappa reduction of more than 30.

Thus, if one wants to obtain a delignification reduction of Kappa 20 or less, this can be done effectively with currently known co-current and counter-current systems. If one wants to obtain a delignification of from 20 to 30 Kappa, it can be done with a provision of special arrangements added to the conventional reactor. The special arrangements would include a means for recycling the reactor gas with the gas being cooled in the recycling means. However, neither prior art system will work effectively if one desires to obtain a delignification reduction of more than Kappa 30.

The trend in the pulp bleaching industry is to expand oxygen bleaching to higher and higher Kappa number reduction. Thus, a pulp bleaching system which will permit the delignification of pulp equivalent to a Kappa number reduction of more than 30 is highly desirable. This invention provides the industry with such a system.

Briefly described the new reactor includes a generally vertical hollow vessel. Material supply means are connected to the upper end of the vessel. The material to be treated flows through the vessel from the top to the bottom in the form of a gas permeable bed and is discharged from the lower end of the vessel. An upper gas inlet is provided in the upper end of the vessel. Gas is supplied through this gas inlet and flows co-currently with the flow of the gas permeable bed but at a much higher velocity. A lower gas inlet is provided in the lower end of the vessel through which gas is supplied and flows counter-currently to the flow of the pulp bed. Gas outlet means are provided on the vessel between the upper and lower gas supply inlets. An upper gas recirculation conduit means connects the gas outlet means with the upper end of the vessel for recirculating gas back into the upper end of the vessel. A lower gas recirculation conduit means connects the gas outlet means with the lower end of the vessel for recirculating gas back into the lower end of the vessel. The lower gas recirculation conduit means has a gas cooler for lowering the temperature of the gas flowing through the lower gas recirculation conduit means.

Briefly described my new method of performing an exothermic reaction of a gas with a suitable material comprises the steps of supplying gas to the upper part of a retention vessel at a controlled rate and flowing the gas downwardly co-currently through the gas permeable bed at a velocity greater than that of the downward movement of the gas permeable bed. The unreacted gas is removed from the vessel at a point above the bottom of the gas permeable bed. Simultaneously gas is supplied to the lower part of the retention vessel at a controlled rate at a temperature below the temperature of the gas supplied to the upper part of the retention vessel. The gas flows upwardly counter-currently through the gas permeable bed. The unreacted gas is removed from the vessel at a point above the bottom of the gas permeable bed. The temperature and rate of the gas supplied to the upper part of the retention vessel is such that the gas permeable bed is rapidly heated to the minimum reaction temperature. The temperature and rate of the gas supplied to the lower part of the retention vessel is such that the temperature of the gas permeable bed will not exceed the maximum allowable temperature.

The invention as well as its many advantages may be further understood by reference to the following detailed description and drawings in which.

Figure 1:
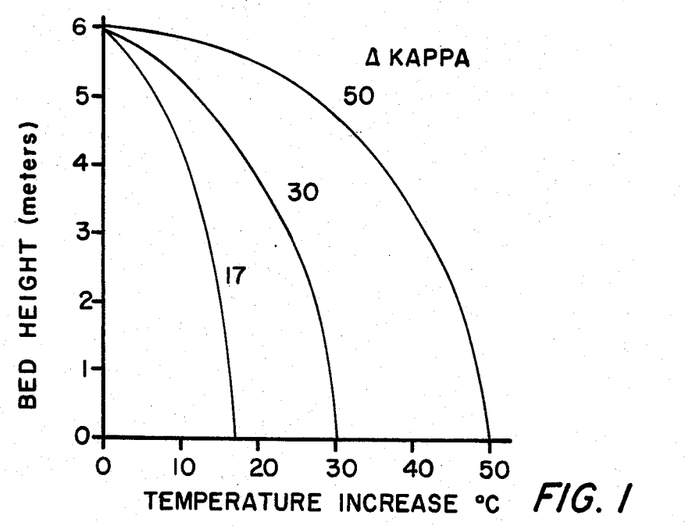
FIG. 1 is a graph showing temperature increase from top to bottom of a reactor without means for controlling the pulp temperature.

Referring to the drawings and more particularly to FIG. 1, the graph shows temperature increases in a pulp bed having a height of 6 meters for a Kappa reduction of 50, a Kappa reduction of 30, and a Kappa reduction of 17 with the pulp having a consistency of, about 30 percent. At lower consistencies of about 12 percent pulp consistency, the additional water in 12 percent consistency pulp acts as a heat sink which prevents an excessive temperature build up. The reaction between lignin and oxygen is exothermic and the heat generated is proportional to the amount of lignin removed. In a reactor without substantial venting or other means for controlling the pulp temperature, the accumulated heat will result in a temperature increase from top to bottom in the pulp bed as shown in FIG. 1. It is usually desired to keep the temperature at the top of the bed at above 90° C. to obtain a reaction rate sufficient to complete the delignification in 20 to 30 minutes. On the other hand, there is a risk of pulp degradation if the pulp temperature exceeds 120° C.

As can be seen from the graph of FIG. 1, reactors with low amounts of delignification (a Kappa reduction of 17) will operate within these limits without special provisions. In general, when an unobstructed pulp bed is reacted with oxygen either by flowing the reaction gas cocurrently with the pulp bed flow or by flowing the reaction gas counter-currently to the pulp bed flow, either system will work satisfactorily with low amounts of delignification of a Kappa reduction of 20, or less. For Kappa reductions of more than 20, it is necessary to have special arrangements in the reactor system for cooling or controlling the temperature in the pulp bed. However, with the prior art even with all types of special arrangements for cooling or controlling the temperature in the pulp bed, the Kappa reduction has been in general limited to 30. The current prior art systems do not work well enough for a delignification equal to a Kappa reduction of more than 30.

Figure 2:
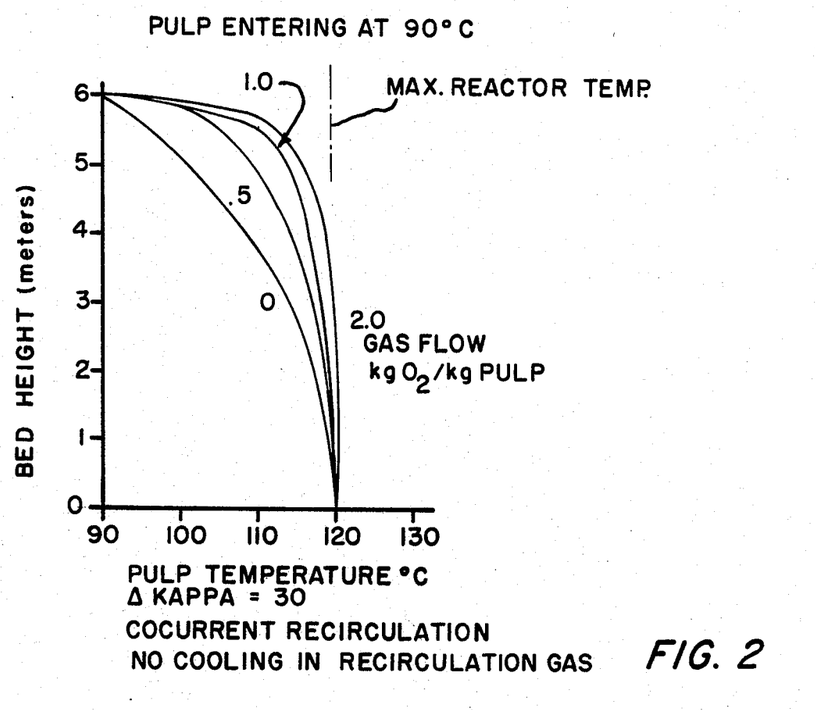
FIG. 2 is a graph showing calculated temperature profiles for various gas flow rates in kilograms of oxygen per kilogram of pulp for a Kappa reduction of 30 in a pulp bed using prior art co-current recirculation.

FIG. 2 is a graph showing calculated temperature profiles for various gas flow rates in kilograms of oxygen per kilogram of pulp for a Kappa reduction of 30 in a pulp bed using a system similar to the system described in U.S. Pat. No. 3,964,962 and assigned to the assignee of this patent application. The gas flows through the pulp bed downwardly at a velocity higher than the moving pulp. Near the bottom of the reactor the gas is separated from the pulp and returned to the top. With the prior art cocurrent recirculation system, the temperature profile may be controlled to prevent degradation of the pulp with a Kappa reduction of up to about 30. Note in the graph of FIG. 2 even at a Kappa reduction of 30, the temperature approaches very closely the degradation temperature of 120° C. For Kappa reductions of more than 30, it is necessary in the prior art co-current recirculation systems to cool the recirculated gas before it is returned to the top of the reactor. Without the cooling the recirculated gas for Kappa reductions of more than 30 would exceed the maximum of 120° C. in the pulp bed and thus cause degradation.

Figure 3:
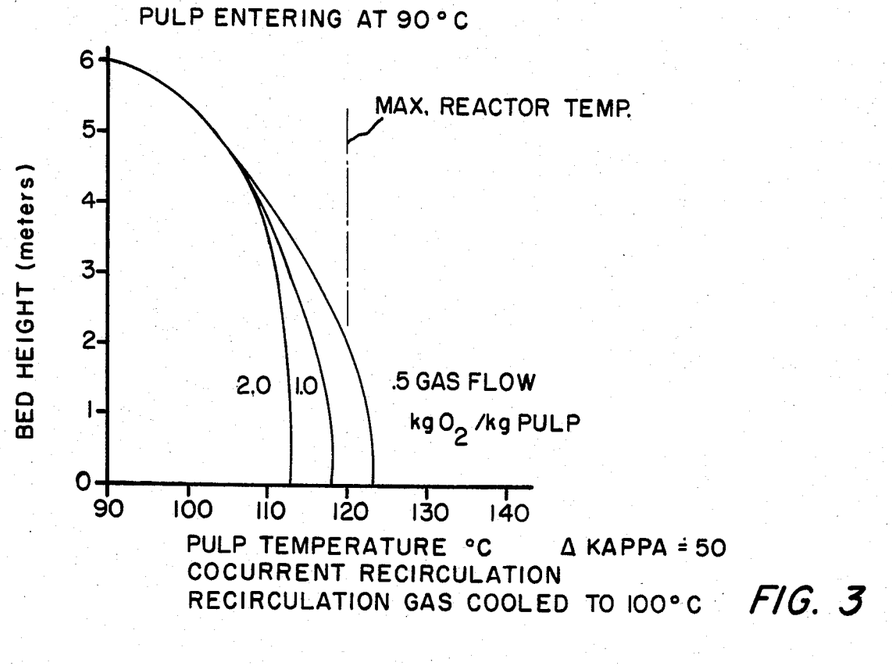
FIG. 3 is a graph showing calculated temperature profiles for a Kappa reduction of 50 in a pulp bed using prior art co-current recirculation with the recirculating gas cooled to 100° C.

Referring to FIG. 3, the graph shows calculated temperature profiles at different gas flow rates for a pulp bed height of 6 meters. The pulp enters the retention vessel at 90° C.; the co-current recirculating gas is cooled to 100° C., and the delignification Kappa number is 50. The FIG. 3 graph is a typical calculated graph for a prior art co-current recirculation oxygen bleaching of pulp system. With such a prior art system the gas is flowed through the pulp bed downwardly at a velocity higher than the moving pulp. Near the bottom of the reactor the unreacted gas is separated from the pulp and recirculated back to the top of the reactor. The temperature near the top of the pulp bed should quickly rise to above 95° C. to obtain a reaction rate sufficient to complete the delignification in 20 to 30 minutes retention time. However, the temperature at any point in the pulp bed must not be allowed to exceed around 120° C. If the temperature exceeds 120° C. degradation of the pulp is likely to occur.

The graph of FIG. 3 shows the calculated temperature profiles in a co-current recirculation gas cooled system for gas flow rates of 0.5 kilogram of oxygen per kilogram of pulp; 1.0 kilogram of oxygen per kilogram of pulp; and 2.0 kilograms of oxygen per kilogram of pulp. A recirculation rate of 1 or more kilogram of oxygen per kilogram of pulp will give the desired temperature control. However, this corresponds to a relative gas velocity of 18 or more feet per minute. Gas flows of this magnitude cannot be handled in a co-current system without excessive pressure drop and pulp compaction in a porous pulp bed of 6 meters height. For effective bleaching of the pulp excessive pulp compaction in the porous pulp bed must be avoided. It is necessary that the pulp in the pulp bed be fluffy and sufficiently gas permeable to perform the bleaching operation. Therefore, a co-current recirculating gas system even with the gas being cooled before it is recirculated back to the top of the retention vessel is not effective for high Kappa reduction delignification. Therefore, even though the graph of FIG. 3 shows the temperature for a 50 Kappa reduction may theoretically be kept below 120° C., as a practical matter it cannot be done with prior art systems because the required recirculation rate is too high.

Figure 6:
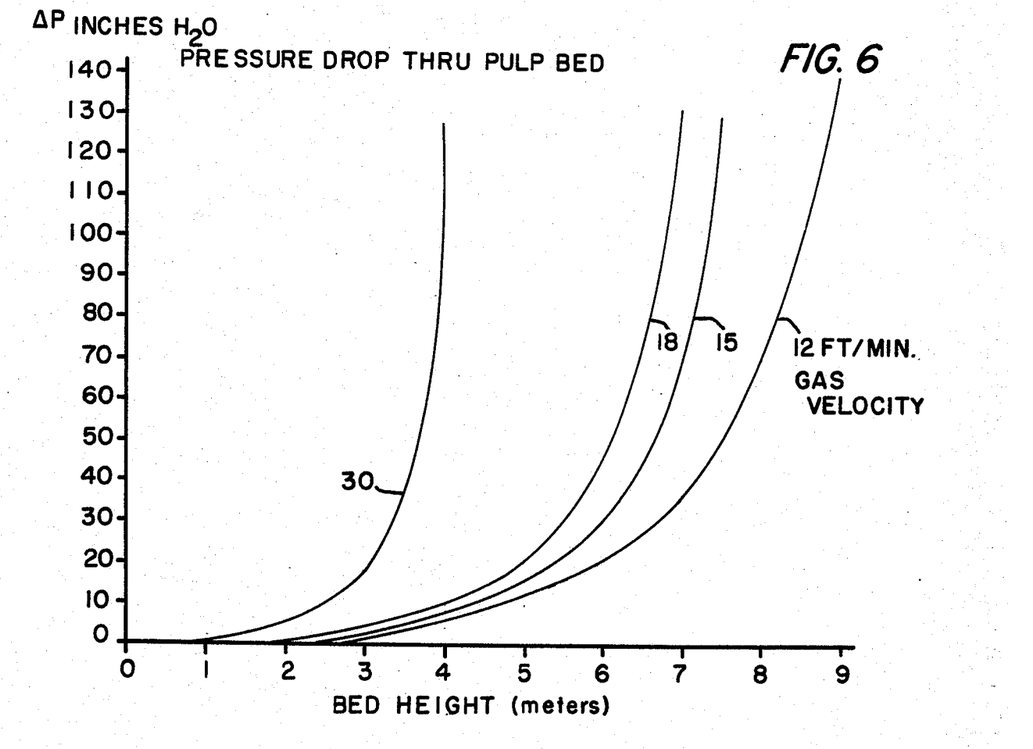
FIG. 6 is a graph showing theoretical pressure drops through a pulp bed based on lab data.

A gas recirculation of 1.0 to 1.5 kilograms of oxygen per kilogram of pulp would result in a relative velocity of 18 to 27 feet per minute. According to the graph of FIG. 6, 18 feet per minute causes a pressure drop of 50 inches H$_2$O through a 6 meter pulp column. This high pressure drop would cause excessive compression of the pulp column at the bottom which is undesirable for the reaction. Also as seen from the graph of FIG. 6, it is impossible to reach 27 feet per minute gas velocity in a 6 meter column because the pressure drop would be so high that the pulp compaction would shut off all gas flow.

FIG. 3 shows the calculated temperature profiles for a Kappa reduction of 50 and because of the high gas velocity required it is impossible to successfully use the co-current recirculation prior art type system for a Kappa reduction of 50. The calculated temperature profiles for Kappa reductions ranging from 31 to 49 are similar to those shown in FIG. 3. It is impossible to use the cocurrent recirculation prior art type systems for a Kappa reduction of any amount more than 30.

Figure 4:
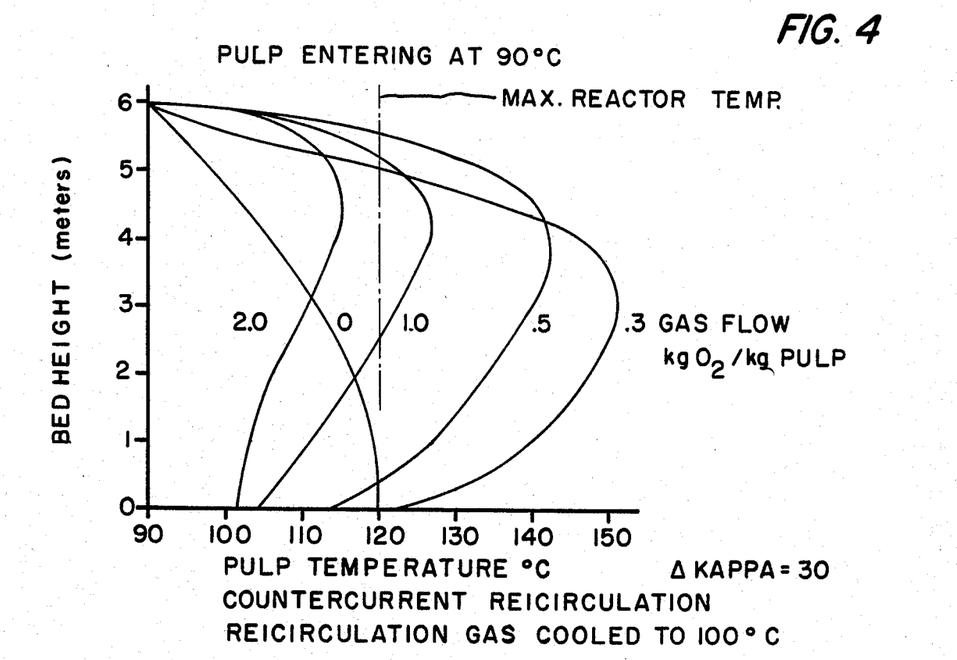
FIG. 4 is a graph showing calculated temperature profiles for a Kappa reduction of 30 in a pulp bed using prior art counter-current circulation with the recirculating gas cooled to 100° C.
Figure 5:
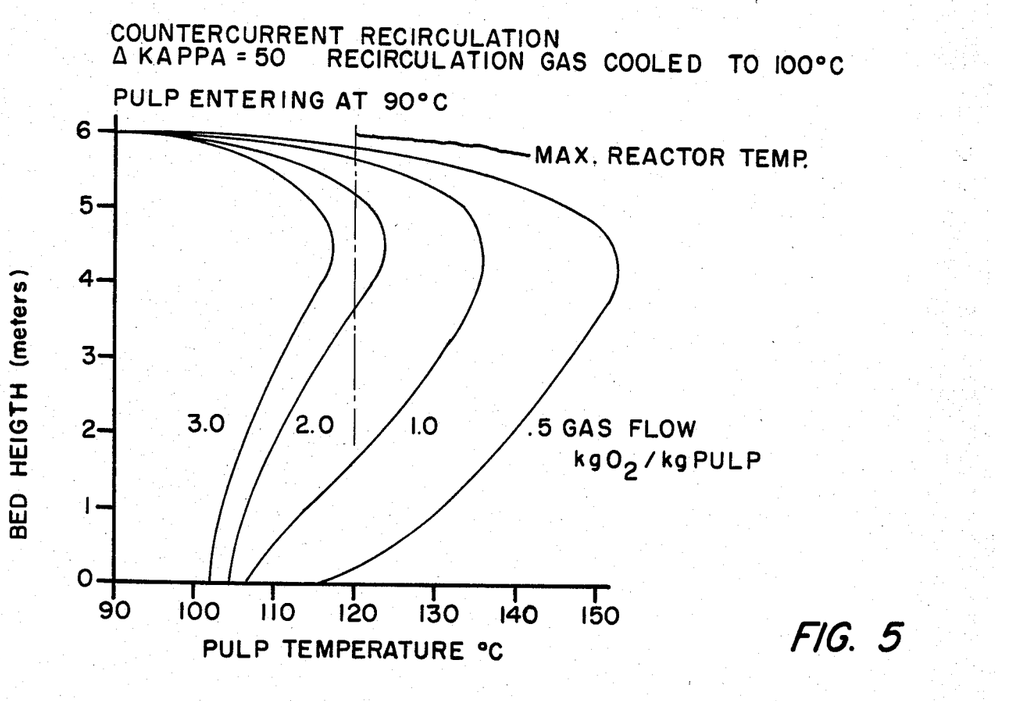
FIG. 5 is a graph showing calculated temperature profiles for a Kappa reduction of 50 in a pulp bed using prior art counter-current circulation with the recirculating gas cooled to 100° C.

FIG. 4 is a graph showing calculated temperature profiles at different gas flow rates for a pulp bed height of 6 meters. The pulp enters the retention vessel at 90° C.; the counter-current recirculating gas is cooled to 100° C.; and the delignification Kappa number is 30. In a counter-current system the gas flows counter-currrent to the flow of the pulp pile or bed. The circulating gas is removed from the top of the reactor and re-enters at the bottom after flowing through a cooler. The calculated temperature profiles of FIG. 4 are based on a countercurrent flow of gas through a pulp bed with the vessel being unobstructed. The graph of FIG. 4 shows gas flow rates of 0.3 kilograms of oxygen per kilogram of pulp, 0.5 kilograms of oxygen per kilogram of pulp, 1.0 kilogram of oxygen per kilogram of pulp, and 2.0 kilograms of oxygen per kilogram of pulp. It can be seen from the graph of FIG. 4 that a gas recirculation flow rate of at least 1.5 kilograms and probably around 2 kilograms or more of oxygen per kilogram of pulp must be maintained in the reactor in order to make certain that at no point in the reactor the pulp temperature exceeds 120° C. A gas flow rate of a maximum of 2.0 kilograms of oxygen per kilogram of pulp is about the maximum rate which may be used in a countercurrent recirculation gas cooled system. At higher rates of gas recirculation the gas recirculation against the pulp flow can prevent the pulp from flowing downward in the reactor and cause a "hang-up" especially in the upper portion of the bed where the pulp is only lightly compacted. For delignification amounting to a reduction in Kappa of more than 30 if a counter-current recirculation system could be used, the rate of gas flow per kilogram of pulp would have to be more than 2.0 kilograms of oxygen per kilogram of pulp which of course is undesirable. As the Kappa reduction increases the rate of oxygen per kilogram of pulp would also increase. FIG. 5 is a graph showing calculated temperature profiles at different gas flow rates for a pulp bed height of 6 meters. The delignification Kappa number is 50. The pulp enters the retention vessel at 90° C. and the countercurrent recirculating gas is cooled to 100° C. The circulating gas is removed from the top of the reactor and re-enters at the bottom after flowing through a cooler. The graph of FIG. 5 shows gas flow rates of 0.5 kilograms oxygen per kilogram of pulp, 1.0 kilogram of oxygen per kilogram of pulp, 2.0 kilograms of oxygen per kilogram of pulp, and 3.0 kilograms of oxygen per kilogram of pulp. It can clearly be seen from the graph of FIG. 5 that a gas recirculation flow rate of 3 kilograms or more of oxygen per kilogram of pulp must be maintained in the reactor in order to make certain that at no point in the reactor the pulp temperature exceeds 120° C. Such a high rate of gas recirculation against the pulp flow is highly undesirable. High rates of gas recirculation against the pulp flow can prevent the pulp from flowing downward in the reactor and cause a "hang-up", especially in the upper portion of the bed where the pulp is only lightly compacted. Also, the pulp entering into the top of a reactor is fluffy and the pulp fibers includes large amounts of fine fibers. Gas removal at this point is not desirable because of the large amounts of fine fibers floating in the gas stream. Therefore, conventional counter-current recirculating systems also cannot be used effectively for high delignification.

Figure 7:
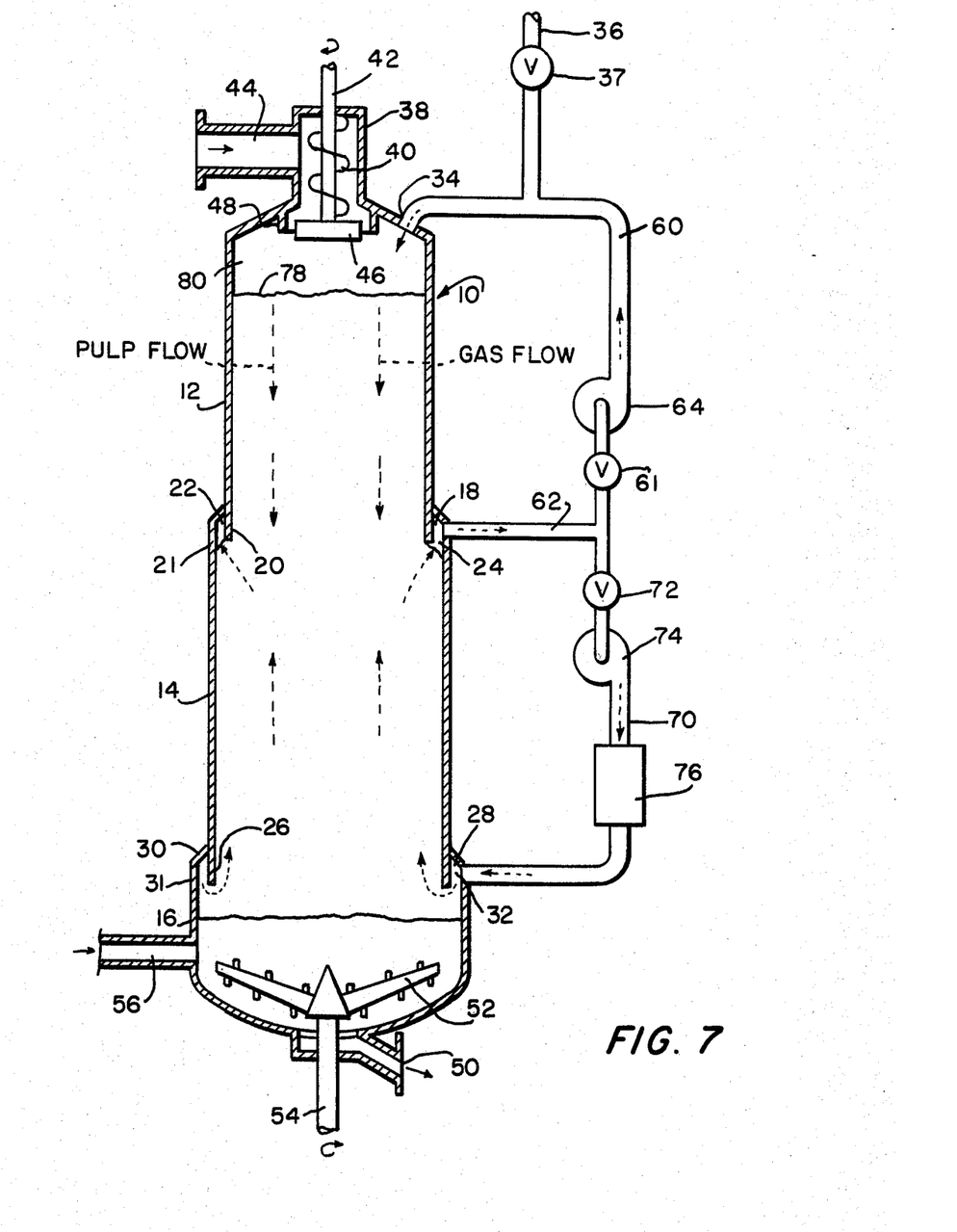
FIG. 7 is a view schematically illustrating one preferred embodiment constructed in accordance with the present invention.

The preferred embodiment of the invention shown in FIG. 7 includes a generally hollow reaction vessel 10. The reaction vessel 10 has an upper portion 12, an adjoining middle portion 14, and an adjoining bottom or lower portion 16. The upper portion 12 of the vessel 10 is formed of horizontal cross-section or cross-sectional area substantially less than that of the communicating middle portion 14. The lower part 20 of the upper portion 12 extends partially into the middle portion 14 to provide a first gas receiving chamber 18 defined by lower part 20 of the upper portion 12, the upper outer periphery 21 of the middle portion 14, and the upwardly tapering annular closure wall 22 interconnecting the middle portion 14 and the upper portion 12.

The upper end of the chamber 18 is closed by the annular closure wall 22; however, below the closure wall 22, a gas discharge outlet 24 is connected to the chamber 18 for discharging gas from the latter.

The middle portion 14 of the vessel 10 is formed of horizontal cross-section or cross-sectional area substantially less than that of the communicating lower portion 16. The lower part 26 of the middle portion 14 extends partially into the lower portion 16 to provide a second gas receiving chamber 28 defined by lower part 26, the upwardly tapering annular enclosure 30 and the upper outer periphery 31 of the lower portion 16.

The upper end of the chamber 28 is closed by the upwardly tapering annular closure wall 30; however, below the closure wall 30 a gas inlet 32 is connected to the chamber 30 which receives gas fed into the lower portion 16. The upper end of the vessel upper portion 12 is provided with at least one gas inlet 34 which communicates such upper portion 12 with a gas make-up conduit 36 controlled by valve 37. The upper end of the vessel upper portion 12 is further provided with a material inlet or inlet conduit 38 which is connected to such upper end generally centrally of the vessel 10. The inlet conduit 38 contains a feed screw 40, mounted on a supporting shaft 42 rotatably driven by a driving motor (not shown) which is adapted for downwardly feeding material into the vessel upper portion 12. The inlet conduit 38 is connected to a material supply conduit 44. The upper end of the vessel upper portion 12 contains means particularly adapted for disintegration, breaking up, and fluffing the material supplied to the inlet conduit 38. Such means also spreads the disintegrated, broken up, and fluffed material across the cross-section of the vessel upper portion 12. As illustrated, such means are of the type described in U.S. Pat. No. 3,785,577, and comprises an inner annulus or ring 46 of arcuately spaced apart rotary pins connected to the shaft 42 for driven rotation therewith and a coaxial, radially spaced, outer annulus or ring 48 of arcuately spaced apart stationary pins. During operation of the apparatus, the annulus 46 of rotary pins is continuously rotatably driven relative to the annulus 48 of stationary pins; and material supplied through the inlet conduit 38 is disintegrated or fluffed by the relative motion of the pins and then is discharged outwardly through the spaces between the adjacent ones of the pins to be resultantly spread in fluffed, disintegrated, or broken up condition across the cross-section of the vessel 10.

The lower end of the vessel 10 is provided with discharge means for discharging material from the vessel 10, such discharge means being illustrated as comprising a pulp outlet conduit 50 connected to the vessel lower end, and a scraper 52 in the vessel lower end adjacent the outlet 50 adapted to be rotatably driven by a driving motor (not shown) through a driving shaft 54. A dilution supply conduit 56 supplies dilution liquor to the lower end of the vessel. However, it will be understood the discharge means of the apparatus can be of other suitable construction.

The apparatus further includes means for redistributing heat in the reaction vessel 10 during the reaction process to control the temperature therein. More specifically, a recirculation conduit 60, external to the vessel 10, is connected at opposite ends to the gas outlet 24 and the gas inlet 34 for recirculating a portion of the gas discharged through the gas conduit 62 back through the gas inlet 34 into the upper end of the vessel. The recirculating conduit 60 controlled by valve 61 moreover is provided with a conventional centrifugal blower 64 adapted for blowing the recirculated gas through the recirculation conduit 60 to the gas inlet 34; and as illustrated the gas make-up conduit 36 is connected to the gas inlet 34 through the recirculation conduit 60 whereby the recirculated gas and the gas supplied by the conduit 36 are supplied intermixed through the inlet 34.

A portion of the gas flowing through conduit 62 from outlet 24 is recirculated through a recirculation conduit 70 controlled by valve 72. The recirculation conduit 70, external to the vessel 10, is connected to the gas inlet 32 for recirculating the gas discharged through conduit 70 back through the gas inlet 32 into the lower end of the vessel. The recirculating conduit 70 is provided with a conventional centrifugal blower 74 adapted for blowing the recirculated gas through the recirculating conduit 70 to the gas inlet 32. The gas circulating through recirculation conduit 70 is passed through a gas cooler 76 where it is cooled before the gas is recirculated back to the gas inlet 32.

A description of the operation of the before described apparatus and the oxygen delignification of cellulose pulp hereinafter follows, it being understood that the maximum temperature in the vessel 10 during such reaction must be maintained below about 120°–125° C. to prevent degradation of the pulp.

Throughout such operation the shafts 42 and 54 are continuously rotatably driven to provide continuous rotation of the screws 40, the annulus 46 of the rotary pins and the bottom scraper 52. Pulp being reacted is retained in the vessel 10 at a reactor pressure of approximately 100 psi for the period of 20 to 30 minutes suitable or desirable for the reaction in a porous, gas permeable bed or plug of fluffed pulp, which bed has its upper end generally as indicated by the reference numeral 78 and spaced below the upper end of the vessel upper portion by a gas space 80. The generally hollow reaction vessel provides an unobstructed material flow path separating the material inlet and the discharge means. The pulp moves progressively downwardly in the porous plug form as reacted pulp and is discharged from the bottom of the plug through the outlet 50.

The feed screw 40 continuously receives pulp from the conduit 44 and feeds the pulp downwardly to the therebelow annuli 46, 48 of relatively rotating pins. Such pins, due to their relative rotation, disintegrate and fluff the pulp to a condition suitable for the reaction and the formation in the vessel 10 of the before described porous, gas permeable pulp plug. The annuli 46, 48 of pins, furthermore discharges the pulp in a radially outwardly flow between adjacent ones of the pins whereby the pulp showers downwardly through the space 80 onto the upper end 78 of the therebelow pulp plug.

Simultaneously, reaction gas or oxygen is continuously supplied at a controlled rate and temperature through the gas inlet 34 into the space 80 into the pulp showering downwardly therethrough. Hence, the pulp during its downwardly showering is exposed to the introduced reaction gas and a small portion of the reaction gas reacts with the pulp at this time. The unreacted gas continues downwardly through the porous pulp plug at a velocity which is substantially greater than that of the downward movement of the pulp. An additional volume of the recirculation gas reacts with the pulp during downward flow, and the remaining gas passes upwardly through the gas discharge chamber 24 and into the outlet conduit 62. A portion of the gas flowing through outlet conduit 62 is fed through valve 61, through the gas recirculation conduit 60 by the blower 64, and into the upper end of the vessel upper portion 12. The recirculated gas is supplied into the gas space 80 through the gas inlet 34 intermixed with gas from the gas supply conduit 36. The major portion of the heat contained in the recirculated gas is in the form of water vapor due to evaporation of water from the hot pulp. The recirculated gas entering the gas space 80 has a higher temperature than the entering pulp and, due to high turbulence in the gas space 80, and the large exposed surface area of the pulp showering downwardly therethrough, heat transfer from the recirculated gas to such pulp by condensation of the water vapor contained in the recirculated gas occurs almost instantaneously. Therefore substantially, equalized temperature of the recirculated gas and the fluffed pulp is attained prior to the deposit of pulp on the upper level 78 of the pulp bed. The amount of this heat transfer from the recirculated gas to the pulp is, of course, dependent upon the rate and temperature of gas recirculated.

Simultaneously, a portion of the gas from conduit 62 is fed through the recirculating conduit 70 controlled by valve 72, the gas cooler 76, and then recirculated back through the lower gas inlet 32 into gas chamber 28, and upwardly through the middle portion 14 of the vessel 10, through the gas chamber 18, and out of gas outlet 62.

The temperature and rate of the gas supplied to the upper part 12 of the retention vessel 10 must be such that the gas permeable bed is rapidly heated to the minimum reaction temperature. Also, the temperature and rate of gas supplied to the lower part of the retention vessel must be such that the temperature of the gas permeable bed will not exceed the maximum allowable temperature of 120° C. to 125° C. This is particularly important for the delignification of pulp in high amounts such as a reduction in Kappa equal to 30 or more.

If the wood pulp bed height is approximately 6 meters and it is desired to provide a Kappa reduction of 30 Kappa or more, less than 1 kilogram of oxygen per kilogram of pulp is to be recirculated to the upper part of the retention vessel and at least 2 kilograms of oxygen per kilogram of pulp cooled to 100° C. is recirculated countercurrently to the movement of pulp to the power part of the retention vessel.

Figure 8:
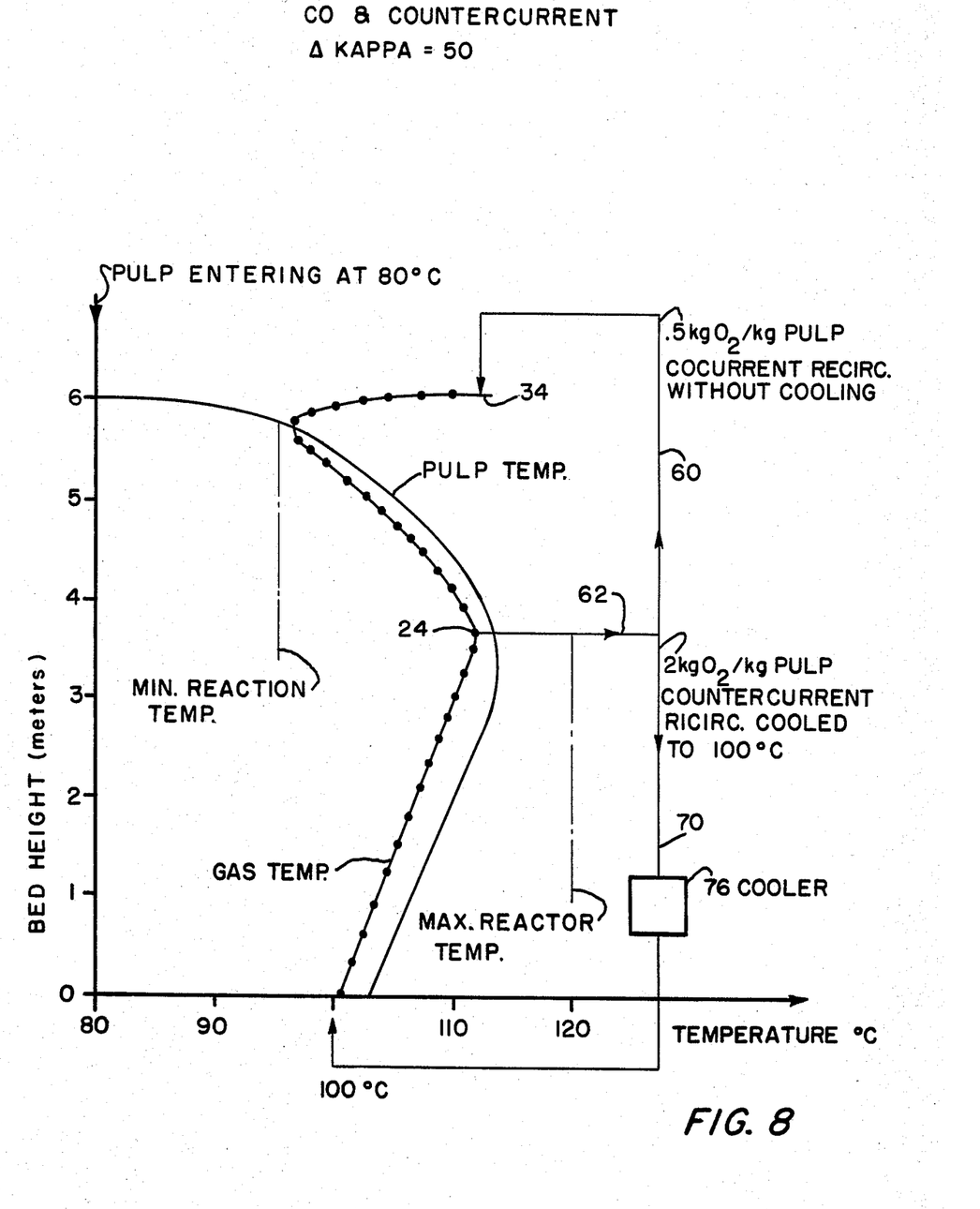
FIG. 8 is a graph showing a calculated temperature profile for a 50 Kappa reduction in a pulp bed using the embodiment of FIG. 7.

The delignification reduction of a pulp equal to 50 Kappa reduction is illustrated in FIG. 8 which is a graph showing the temperature profile of the pulp using the embodiment of the invention shown in FIG. 7. The pulp bed height is 6 meters. The pulp enters the retention vessel at 80° C. Gas is withdrawn from the reactor at the point of highest gas temperature. This gas is recirculated without cooling to the top of the reactor, thus heating up the incoming pulp rapidly to the minimum reaction temperature. With the bottom recirculation. the hot gas is cooled to 100° C. before re-entering. This will prevent the pulp from exceeding the maximum allowable temperature. As can be seen from the more specific example of the 50 Kappa reduction shown in FIG. 8, the amount of pulp recirculated to the upper part of the retention vessel is 0.5 kilograms of oxygen per kilogram of pulp and the amount of oxygen recirculated to the lower part of the retention vessel is 2 kilograms oxygen per kilogram of pulp.

Co-current recirculation at the top of the reactor has the following advantages:

1. Pulp is only lightly compacted in top layers. There is only a minimal resistance to the gas flow.
2. Co-current flow in the top layers will prevent pulp hang-up.
3. Hot gas from the reactor is used to heat up the incoming pulp, thus saving steam.
4. Pulp will heat up quickly to the minimum reaction temperature because of the gas heat transfer between the hot gas and the fluffed pulp.
5. Large amounts of fine fibers are floating in the gas stream surrounding the fluffer. Co-current gas flow forces these fibers to settle in the pulp bed.

Counter-current recirculation in the bottom layers of the pulp bed has the following advantages:

1. Counter-current flow will prevent excessive compaction in the bottom layers, thus keeping the flow resistance to a minimum.
2. Heat is efficiently removed, thus preventing the pulp from exceeding the maximum allowable temperature and avoiding pulp degradation.

I claim:

1. A method of reducing the lignin in wood pulp by a Kappa reduction of more than 30 comprising: continuously feeding the wood pulp into the upper part of a retention vessel having a material inlet in its upper end, discharge means at its lower end, and an unobstructed material flow path separating the material inlet and the discharge means, which wood pulp moves downwardly through the vessel in the form of a single gas permeable bed, and is discharged from the lower part of the retention vessel; supplying oxygen gas to the upper part of the retention vessel, flowing the oxygen gas downwardly through and co-current to the gas permeable bed at a velocity greater than that of the downward movement of the gas permeable bed; removing unreacted oxygen gas from the vessel in the area of highest gas temperature which is at a point above the bottom of the gas permeable bed; recirculating a portion of the unreacted gas removed from the retention vessel to the upper part of the retention vessel without cooling said portion; cooling the remainder of the unreacted gas removed from the retention vessel and recirculating said remainder to the lower part of the retention vessel; flowing such oxygen gas upwardly through and counter-current to the gas permeable bed, and removing unreacted oxygen gas from the vessel at said point above the bottom of the gas permeable bed, the total of the removed unreacted oxygen gas from the co-current gas flow plus the removed unreacted oxygen gas from the counter-current gas flow constituting the portion recirculated to the upper part of the retention vessel, and the remainder recirculated to the lower part of the retention vessel, the rate and temperature of the oxygen gas supplied to the upper part of the retention vessel and the rate and temperature of the oxygen gas supplied to the lower part of the retention vessel being such that the gas permeable bed is rapidly heated to the minimum reaction temperature, but the temperature of the gas permeable bed will not exceed the maximum allowable temperature.

2. The method of claim 1 wherein: the oxygen gas supplied to the upper part of the retention vessel is at a rate of less than 1 kilogram of oxygen per kilogram of pulp, and the oxygen gas supplied to the lower part of the retention vessel is at a rate of at least 2 kilograms of oxygen per kilogram of pulp.

* * * * *